(12) United States Patent
Hjort Larsen et al.

(10) Patent No.: US 12,711,877 B2
(45) Date of Patent: Aug. 18, 2026

(54) APPARATUS FOR SIMULATING AN ATONIC UTERINE BODY

(71) Applicants: UNIVERSITÉ PARIS CITÉ, Paris (FR); Univ Paris XIII Paris-Nord Villetaneuse, Villetaneuse (FR); Assistance Publique-Hopitaux de Paris, Paris (FR)

(72) Inventors: Nicoline Hjort Larsen, Paris (FR); Pierre François Ceccaldi, Paris (FR); Vincent Lemarteleur, Tronville en Barrois (FR); Aurélie Benoit, Paris (FR); Sid-Ahmed Remini, Clichy-sous-bois (FR)

(73) Assignees: UNIVERSITÉ PARIS CITÉ, Paris (FR); Univ Paris XIII Paris-Nord Villetaneuse, Villetaneuse (FR); Assistance Publique-Hopitaux de Paris, Paris (FR)

( * ) Notice: Subject to any disclaimer, the term of this patent is extended or adjusted under 35 U.S.C. 154(b) by 721 days.

(21) Appl. No.: 18/154,406

(22) Filed: Jan. 13, 2023

(65) Prior Publication Data

US 2023/0237930 A1 Jul. 27, 2023

(30) Foreign Application Priority Data

Jan. 14, 2022 (FR) ...................................... 2200322

(51) Int. Cl.
*G09B 23/30* (2006.01)
*G09B 23/28* (2006.01)

(52) U.S. Cl.
CPC .................................. *G09B 23/281* (2013.01)

(58) Field of Classification Search
CPC ................................ G09B 23/28; G09B 23/30
(Continued)

(56) References Cited

U.S. PATENT DOCUMENTS 4,701,161 A 10/1987 Lenck
5,472,345 A * 12/1995 Eggert ................. G09B 23/281 434/273

(Continued)

FOREIGN PATENT DOCUMENTS

FR 2580933 A1 10/1986
WO 2014191702 A2 12/2014

OTHER PUBLICATIONS

French Preliminary Search Report for Application No. FR 2200322 dated Aug. 19, 2022, 2 pages. [See p. 1, categorizing the cited references].

*Primary Examiner* — Kurt Fernstrom
(74) *Attorney, Agent, or Firm* — Lerner David LLP

(57) ABSTRACT

An apparatus for simulating an atonic uterine body after childbirth includes a one-piece part, which includes:
- a flexible body having the shape of an atonic uterine body after childbirth, the flexible body is bendable by hand so that the flexible body reproduces a haptic behavior of an atonic uterine body after childbirth; and
- a rigid neck extending the flexible body, the rigid neck surrounding an opening of the part, the rigid neck having a rigidity greater than a rigidity of the flexible body. The part defines an outer surface and an inner surface. The inner surface defines an inner cavity of the part, wherein
- the inner cavity opens out into the outer surface so as to define the opening.

12 Claims, 4 Drawing Sheets

(58) Field of Classification Search
USPC .......................................................... 434/273
See application file for complete search history.

(56) References Cited

U.S. PATENT DOCUMENTS

| | | | | |
|---|---|---|---|---|
| 9,918,872 | B1 * | 3/2018 | Crowson | A61F 7/123 |
| 9,972,219 | B2 * | 5/2018 | Garvik | G09B 23/281 |
| 10,223,936 | B2 * | 3/2019 | Black | G09B 23/285 |
| 10,235,903 | B2 * | 3/2019 | Souter | G09B 23/281 |
| 11,100,815 | B2 * | 8/2021 | Hofstetter | G09B 23/281 |
| 2017/0301263 | A1 | 10/2017 | Souter et al. | |
| 2021/0280085 | A1 * | 9/2021 | Utria Terán | G09B 23/30 |
| 2022/0044595 | A1 * | 2/2022 | Hoke | G09B 23/34 |

* cited by examiner

APPARATUS FOR SIMULATING AN ATONIC UTERINE BODY

CROSS-REFERENCE TO RELATED APPLICATIONS

This application claims priority from French application number 2200322, filed Jan. 14, 2022, the disclosure of which is hereby incorporated herein by reference.

FIELD OF THE INVENTION

The invention relates to an apparatus for simulating an atonic uterine body, particularly a post-partum uterine body prone to hemorrhage.

STATE OF THE ART

The maternal morbidity and mortality is a global public health problem according to the World Health Organization (WHO). The global maternal mortality rate from 1990 to 2015 (the number of maternal deaths per 100,000 live births) has declined by only 2.3% per year. Nearly 300,000 pregnant women die every year worldwide, about 25% of them from hemorrhage. In the other cases, these hemorrhages can lead to significant long-term medical and psychological problems for the mother. In France, this concerns 5 to 6% of the 700,000 births per year. It seems necessary to support the prevention programs and the programs of dissemination of the new treatment techniques regarding risky situations, in particular uterine hemostasis techniques—that is to say uterine hemorrhage stopping techniques—like the intrauterine tamponade balloon or the hemostasis uterine surgery such as the uterine compression suture described by Prof. C B-Lynch and Dr. Cho.

This training involves in particular the use of simulation apparatuses imitating a patient or an anatomical part of a patient (also known as task trainer, that is to say a task or a gesture training system). In gynecology-obstetrics, dedicated simulators allow reproducing emergency or daily clinical situations relating to pregnancy or childbirth.

The training is facilitated by a standardization of the dummies, which makes them financially more accessible. However, these simulation tools for obstetric purposes remain insufficient, particularly those that simulate uterine hemorrhages.

In these hemorrhage situations, the uterine cavity is in an atonic state that is to say with a very low stiffness of the tissues, the uterus then not retaining its normal position and bleeding profusely.

To improve the quality of care relating to these situations, it is necessary to improve educational models of a uterine hemostasis, and particularly to develop a simulation apparatus configured to fit into a large number of dummies.

DISCLOSURE OF THE INVENTION

One aim of the invention is to propose an apparatus for simulating an atonic uterus that overcomes the obstacles of the prior art.

The aim is achieved in the context of the present invention thanks to an apparatus for simulating an atonic uterine body after childbirth, the apparatus comprising a one-piece part, the part comprising:

- a flexible body having the shape of an atonic uterine body after childbirth, the flexible body being bendable by hand so that the flexible body reproduces a haptic behavior of an atonic uterine body after childbirth;
- a rigid neck extending the flexible body, the rigid neck surrounding an opening of the part, the rigid neck having a rigidity greater than a rigidity of the flexible body;
- the part defining an outer surface and an inner surface, the inner surface defining an inner cavity of the part,
- the inner cavity opening out into the outer surface so as to define the opening.

The one-piece part, which allows simulating a uterine body through its inner cavity, has a more rigid neck and a more flexible body. On the one hand, the more rigid neck allows adapting and fixing the apparatus to a high-fidelity or a low-fidelity dummy, for example by deforming the neck and inserting it into an opening of the dummy. On the other hand, the more flexible body allows a more real simulation of the therapeutic gestures of uterine hemostasis requiring the use of suture needles and threads, as well as folding and compression movements.

Such an apparatus is advantageously and optionally supplemented by the following different characteristics taken alone or in combination:

- the rigid neck has a Shore A hardness comprised between 25 and 35 and the flexible body has a Shore 00 hardness comprised between 10 and 20;
- the part comprises silicone and the part and particularly the inner cavity has dimensions equal to dimensions of an atonic uterine body after childbirth;
- the part is made of composite material, the part comprising a first elastic material for the flexible body, a second elastic material for the rigid neck and a reinforcing layer of a woven textile between the outer surface and the inner surface;
- the reinforcing layer of a woven textile is located closer to the inner surface than to the outer surface;
- the woven textile is polyester, the textile having a basis weight greater than or equal to 20 $g/m^2$ and less than or equal to 25 $g/m^2$;
- the woven textile has a mesh comprised between 200 and 400 meshes per centimeter;
- the part has a thickness between the inner surface and the outer surface, the thickness being variable along the part, the thickness taking a maximum value in the flexible body; and
- the thickness takes on average in the rigid neck a reference value, a ratio between the maximum value and the reference value being comprised between 1.5 and 2.

The invention also relates to a gynecological examination simulation system comprising an apparatus as just described, and a device such as a dummy, comprising a cavity configured to receive the apparatus, the device and the apparatus being configured to be rigidly connected.

The invention relates to a method for simulating a therapeutic gesture, the method comprising a step of setting up a gynecological examination simulation apparatus as just described, a step of manipulating the inner surface so as to make a fold of the inner surface and a step of suturing the fold.

The invention finally relates to a method for simulating a therapeutic gesture, the method comprising a step of setting up a gynecological examination simulation apparatus as just described, a step of inserting an intrauterine balloon into the inner cavity and a step of inflating the intrauterine balloon.

DESCRIPTION OF THE FIGURES

Other characteristics and advantages of the invention will emerge from the following description, which is purely illustrative and not limiting, and must be read in relation to the appended drawings in which.

DETAILED DESCRIPTION OF THE INVENTION

Figure 1:
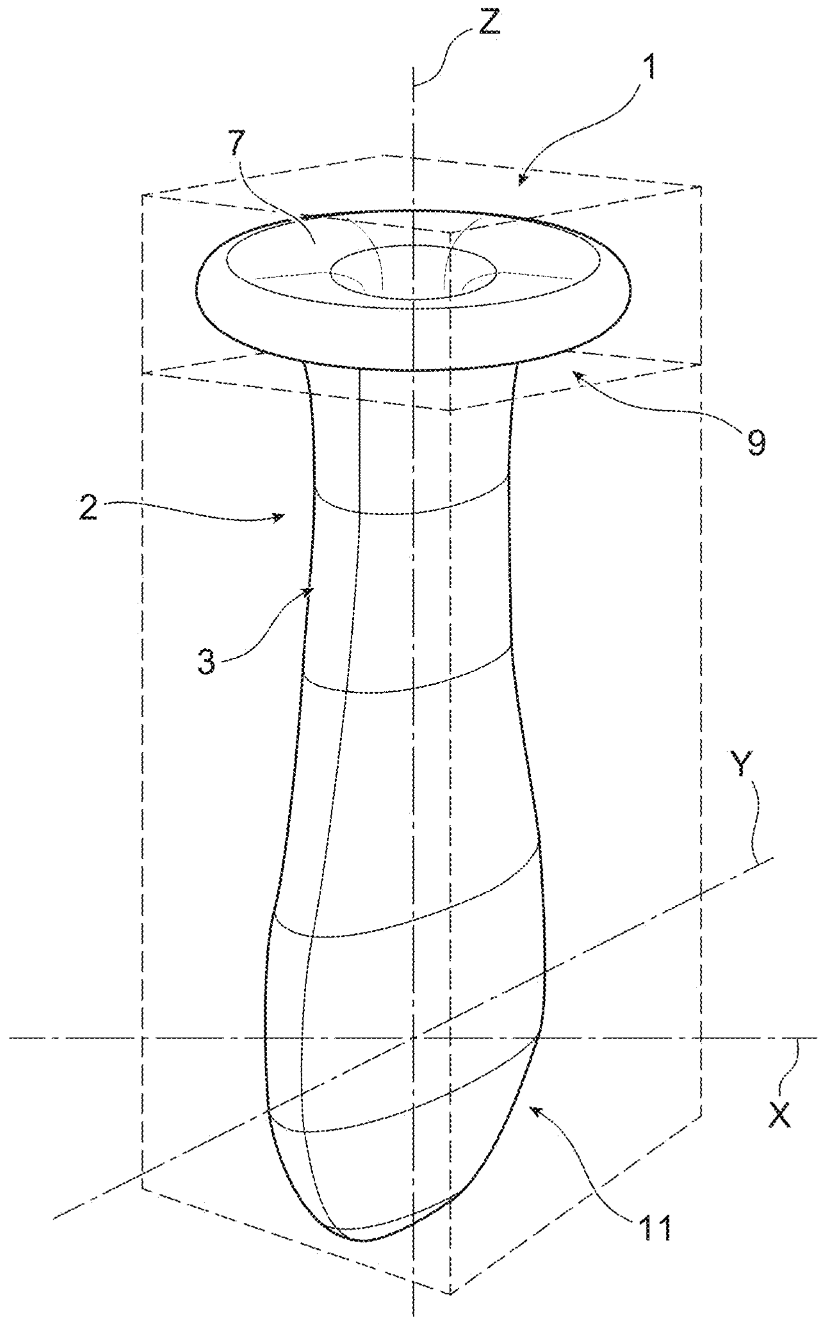
FIGS. 1, 2 and 3 schematically represent an apparatus for simulating an atonic uterine body according to one embodiment of the invention, FIGS. 4 and 5 schematically represent part of an apparatus for simulating an atonic uterine body according to two embodiments of the invention, FIG. 6 schematically represents a detail of a gynecological examination simulation system, and FIG. 7 schematically represents a detail mold of a simulation apparatus.

In relation to FIGS. 1, 2, 3 and 4, the invention relates to an apparatus 1 for simulating an atonic uterine body after childbirth.

The apparatus 1 comprises a one-piece part 2, that is to say an integrally formed or unitary part. The part 2 does not comprise any portions detachable or separable from the rest of the part 2.

The part 2 comprises a flexible body 11 which has the shape of an atonic uterine body after childbirth. The body 11 is said to be flexible in relation to another area of the part 2 which is more rigid than the body 11.

The flexible body 11 is flexible to the point of being bendable by hand. Particularly, an operator can easily pinch a first portion of the body and fold back this first portion against a second portion of the body.

The flexible and hand-bendable nature of the flexible body 11 is such that the flexible body 11 reproduces a haptic behavior of an atonic uterine body after childbirth.

The part 2 further comprises a rigid neck 9. The neck 9 is said to be rigid because it is an area of the part 2 which is more rigid than the body 11. In other words, the rigid neck 9 has a rigidity greater than a rigidity of the flexible body 11.

Regarding the rigidities, the rigid neck 9 can have a Shore A hardness comprised between 25 and 35 and the flexible body 11 can have a Shore 00 hardness comprised between 10 and 20.

The neck 9 extends the flexible body 11, that is to say there is a continuity of material of the part 2 from the flexible body 11 to the rigid neck 9.

The part 2 comprises an opening 7 located in the rigid neck 9. More specifically, the rigid neck 9 defines and surrounds the opening 7.

The neck 9 can have the shape of a flared ring around the opening 7, that is to say the shape of a ring whose diameter increases towards the outside of the part 2.

Figure 3:
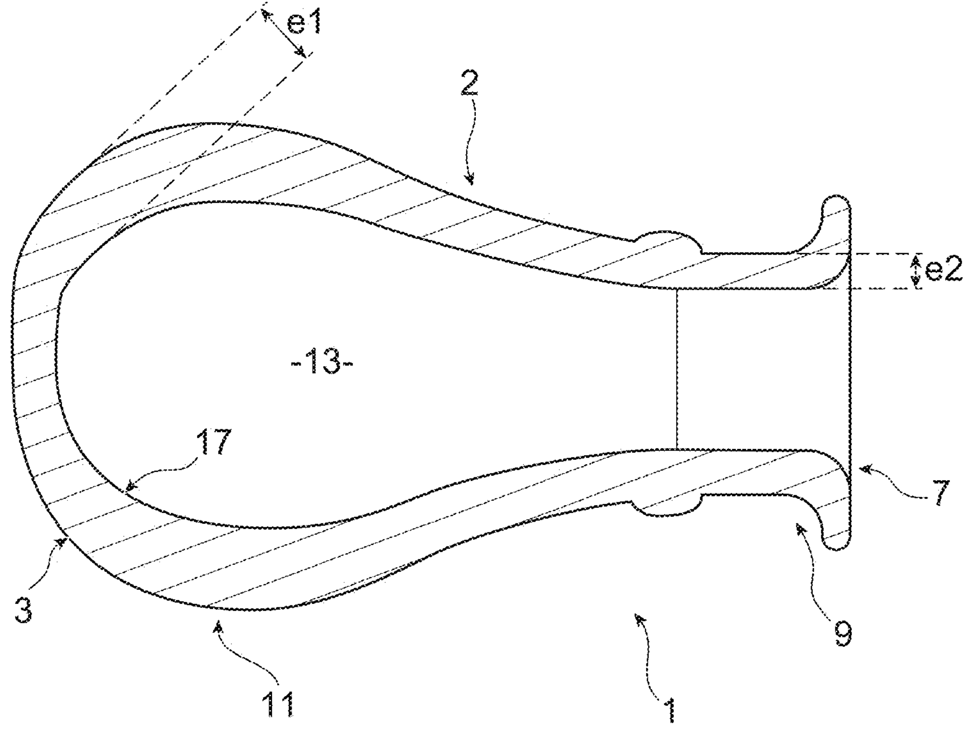
Figure 4:
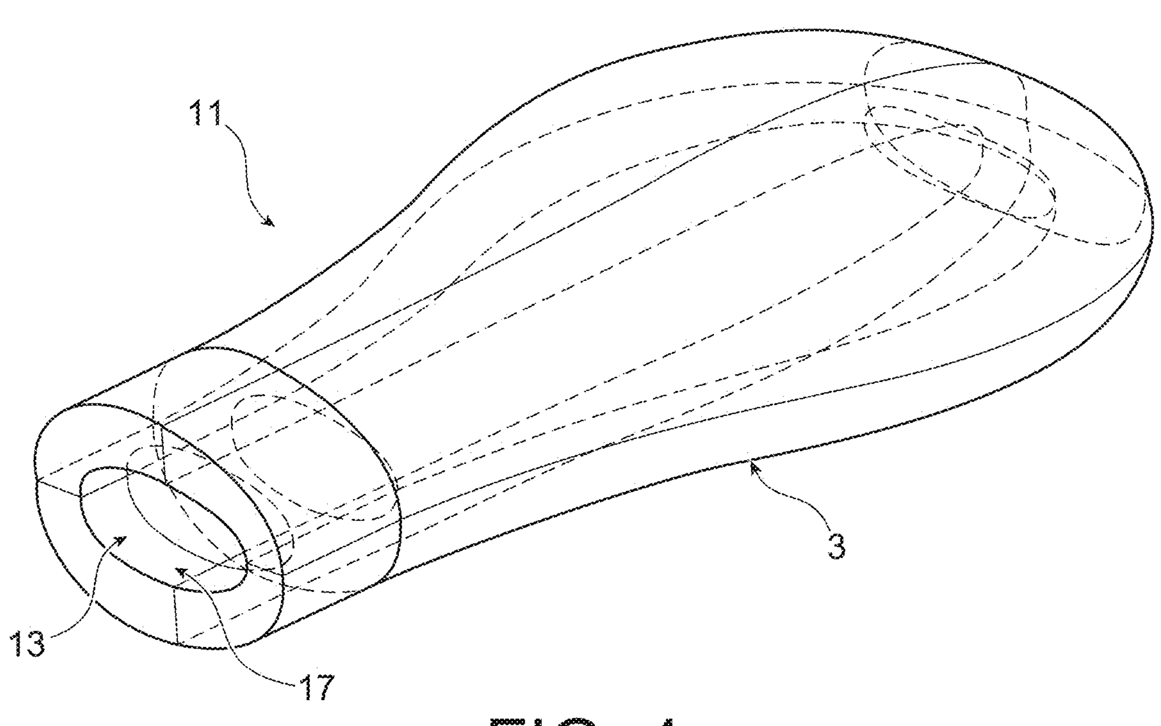

In relation to FIGS. 1 and 3, the part 2 defines an outer surface 3 and an inner surface 17. The flexible body 11 and the rigid neck 9 each define a portion of the outer surface 3 and a portion of the inner surface 17.

Figure 2:
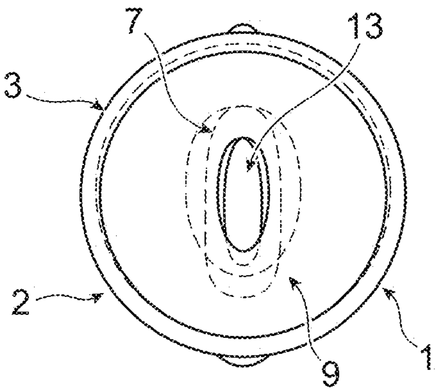

In relation to FIGS. 2 and 3, inside the part 2, the inner surface 17 defines an inner cavity 13 of the part 2.

The inner cavity 13 opens out into the outer surface 3 so as to define the opening 7. The inner surface 17 and the outer surface 3 meet at the opening 7.

The flexible body 11 of the apparatus 1 allows carrying out therapeutic gestures such as movements of folding of the inner surface in the inner cavity and compression movements. The flexible body thus restores haptic sensations close to reality. It is thus possible thanks to this apparatus to train people to therapeutic gestures with a feeling close to reality.

The flexible body 11 can be pierced by a suture needle and thread, and it can retain the needle and the thread according to the same mechanical properties of an atonic uterine body. Again, a trained person can have, during the simulation of the therapeutic gesture of a surgical suture, a feeling close to reality.

To further improve the realism of the simulation, the part 2 can comprise silicone and, furthermore, the part 2 and particularly the inner cavity 13 can have dimensions equal to dimensions of an atonic uterine body after childbirth. The inner cavity can in particular have a volume comprised between 180 milliliters and 500 milliliters.

In this situation, it is possible to simulate an intrauterine tamponade using a Cook-type balloon or the like inflated with 500 mL of sterile water.

The rigid neck 9 of the apparatus 1 allows an adaptation and a fixing of the apparatus 1 on an appropriate area of a dummy, particularly in the opening of a wall of a dummy which simulates a vaginal wall. This opening is conventionally found in all high-fidelity as well as low-fidelity dummies for gynecological anatomy simulation and dedicated to women's health.

The rigid neck 9 is deformable, that is to say it is flexible enough to be deformed and placed in the opening of the wall of a dummy as mentioned above. It is possible to integrate the apparatus into almost any simulation dummy on the market.

Figure 6:
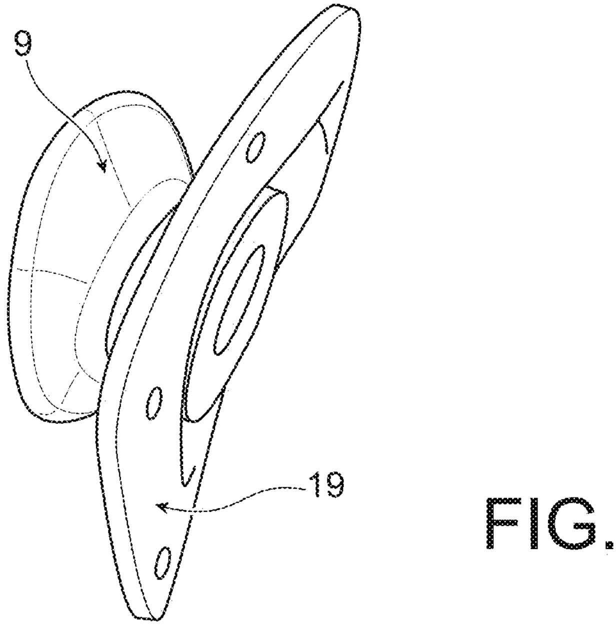

In this sense, and in relation to FIG. 6, the invention also covers a gynecological examination simulation system comprising an apparatus 1 as described in the description in general and a device 19, such as a dummy, the device 19 comprising a cavity configured to receive the apparatus 1, the device 19 and the apparatus 1 being configured to be rigidly connected to each other. FIG. 6 represents a portion of the device 19 which comprises an orifice of the cavity. The rigid neck 9 can be deformed to be slid through this orifice, this orifice being for example an opening in the wall of the dummy.

The rigid neck 9 and the cavity are mechanically and geometrically configured so that once the rigid neck 9 is slid into the cavity, the rigid neck 9 and the cavity are in mechanical contact with each other.

The Shore hardness of the rigid neck 9 is chosen so that the rigid neck 9 remains fixed relative to the device 19 to the cavity, once the rigid neck 9 is inserted into the cavity, without additional fixing element.

Figure 5:
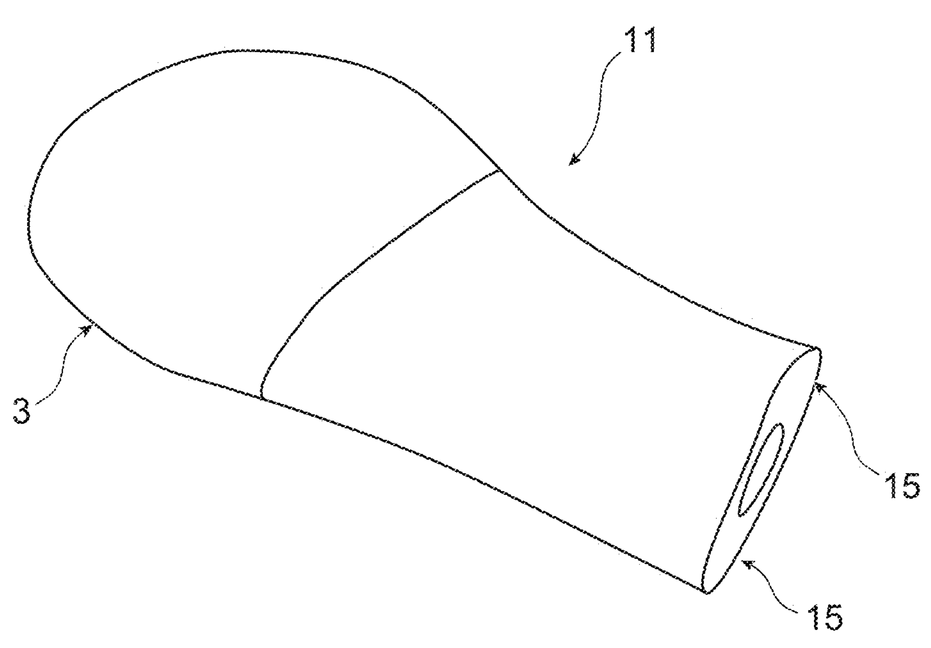

In relation to FIG. 5 and in one particular embodiment of the apparatus, the part 2 is made of composite material and comprises a first elastic material for the flexible body 11, a second elastic material for the rigid neck 9 and a reinforcing layer 15 of a woven textile, the reinforcing layer being located between the outer surface 3 and the inner surface 17.

The presence of the reinforcing layer 15 contributes to restoring the haptic sensations close to reality during therapeutic gestures (surgical compression or surgical suture). The reinforcement particularly allows properly simulating the sensation of mechanical resistance during the insertion of a needle into the flexible body 11.

The presence of the reinforcing layer 15 contributes to being able to position and retain the suture threads in the operation of maintaining the uterus, once folded (surgical suture).

Particularly, the reinforcing layer 15 can be located closer to the inner surface 17 than to the outer surface 3. For example, the textile can be located at a distance comprised between 1 and 2 mm from the inner surface 17.

The woven textile used can be made of polyester, the textile having a basis weight greater than or equal to 20 $g/m^2$ and less than or equal to 25 $g/m^2$.

The woven textile can also have a mesh comprised between 200 and 400 meshes per centimeter.

In relation to FIG. 3, the apparatus 1 as described so far comprises the part 2 which has a thickness e1, e2 between the inner surface 17 and the outer surface 3. This thickness is defined locally, for example along a direction perpendicular to the inner surface 17 and/or the outer surface 3.

The thickness e1, e2 of the part 2 is variable along the part 2, that is to say at two points on the surface 17, the thickness of the part 2 can take different values.

Particularly, the thickness takes a maximum value e1 in the flexible body 11. The thickness can take this value in an area of greater curvature of the flexible body 11, that is to say in an area where the radius of curvature of the inner surface 17 and/or of the outer surface 3 takes a maximum value.

The maximum thickness e1 of the part 2 is greater than the thickness of the part 2 in the rigid neck 9. Particularly, a reference value e2 which is the average value of the thickness in the rigid neck 9 can be defined, and a ratio e1/e2 of the maximum value e1 on the reference value e2 can be defined. It can be chosen to set the ratio e1/e2 to a value greater than or equal to 1.5 and less than or equal to 2.

The part 2 of the apparatus can have the shape of a drop of water or the shape of a balloon. This means that the part 2 comprises on the one hand a first end which has a more curved shape and on the other hand a second end which has a more pointed shape. In other words, at the first end, the slope variations in the planes tangent to the part 2 are continuous, and at the second end there is a discontinuity in the slope variations in the planes tangent to the part 2. The second end has a tip.

The part 2 extends along a main direction Z from the first end to the second end. The main direction Z is represented in FIG. 1.

Around the first end, or curved end, the part 2 is flattened. In this sense, the first end is curved and flattened. This first end is located at the bottom of FIG. 1. This means that in a plane perpendicular to the main direction, the part 2 has a width in a first transverse direction and a depth in a second transverse direction perpendicular to the first transverse direction, the width being at least five times greater than the depth. The perpendicular plane is defined by the first transverse direction Y and the second transverse direction X, the two directions are represented in FIG. 1.

The opening 7 is located at the tip of the second end. This second end is located at the top of FIG. 1

The apparatus 1 can further have in the outer surface 3 two protuberances in the form of veins (and are then close to the second end) or of tubes (and are then close to the first end). The protuberances are located outside the main direction equidistant from the curved and flattened end. The first protuberance called left protuberance and the second right protuberance are symmetrical to each other relative to the main direction. The main direction represents the antero-posterior axis of the human body.

Therapeutic Gesture Simulation

The invention also relates to methods for simulating a therapeutic gesture.

A first method for simulating a surgical suture comprises:

- a step of setting up a gynecological examination simulation apparatus 1 as described above,
- a step of manipulating the inner surface so as to make a fold of the inner surface and
- a step of suturing the fold.

The fold can particularly be made in the flexible body 11 that is flexible enough to make such a fold by hand.

The suture of the fold can be made by using a suture needle in the hole from which a suture thread is threaded. The operator, by exerting a mechanical pressure to maintain the fold, passes the needle several times through the fold, then he stretches the suture thread so as to maintain the fold in place and prevent the inner surface from unfolding once the pressure to maintain the fold is stopped.

A second method for simulating an intrauterine tamponade using a Cook-type balloon or the like comprises:

- a step of setting up a gynecological examination simulation apparatus 1 as described above,
- a step of inserting an intrauterine balloon into the inner cavity,
- a step of inflating the intrauterine balloon.

Manufacture of the Part of the Apparatus by Molding

The part 2 which comprises the flexible body 11 and the rigid neck 9 can be made by molding.

Figure 7:
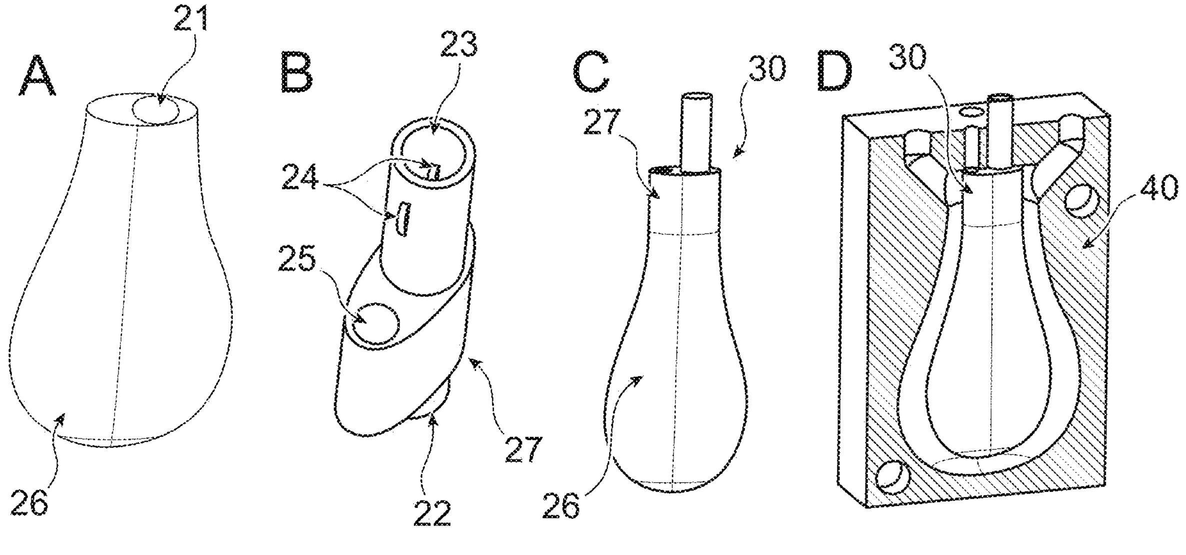

FIG. 7 represents a mold of the part 2. FIG. 7 comprises four different portions A, B, C and D, each portion illustrating a different view of the mold.

The mold comprises an external mold 40 which defines by its inner walls the outer surface 3 of the part 2. The external mold can be composed of two portions that are removable relative to each other. It is therefore possible to attach them together when they are separated and detach them from each other when they are attached together.

The mold is composed of an internal mold 30 which defines by its outer walls the inner surface 17 of the part 2.

The internal mold 30 comprises a lower portion 26 which defines by its outer walls the inner surface 17 of the flexible body 11.

The lower portion 26 is water-soluble. It has an orifice 21 which allows injecting a fluid so as to dissolve the lower portion 26.

The internal mold 30 comprises an upper portion 27 which defines by its outer walls the inner surface 17 of the rigid neck 9.

The upper portion 27 comprises a protuberance 22 adapted to be slid into the orifice 21. This protuberance is hollowed out by a duct which also passes through a cylinder 23 of the upper portion 27. A duct thus passes right through the upper portion from the protuberance 22 to the cylinder 23. The fluid allowing dissolving the lower portion 26 can be injected into the cylinder 23 through this duct up to the orifice 21.

The upper portion 27 comprises centering pins 24 allowing correctly placing the internal mold 30 relative to the external mold 40, as well as a marker 25 allowing centering the mold using a second rod not illustrated in FIG. 7.

In operation, to make a part 2, the lower portion is placed under the upper portion 27 and correctly adjusted in position thanks to the protuberance 22 and the orifice 21.

The internal mold 30 thus formed is inserted into one of the portions of the external mold 40 and correctly adjusted in position thanks to:

- the hollow cylinder which fits into a fitted housing in the external mold,
- the centering pins 24,
- the marker 25 and the second rod.

Once the internal mold is correctly positioned, the second portion of the external mold 40 is attached to the first portion so as to enclose the internal mold 30 in the external mold 40.

Optionally, a reinforcing fabric, for example soaked in thickened shore 00 silicone with fumed silica, is placed between the internal mold 30 and the external mold 40 before attaching the second portion to the first portion of the external mold 40.

A first less rigid silicone (lower Shore hardness) is poured into the mold so as to fill a portion of the space between the internal mold 30 and the external mold 40. This portion of the space corresponds to the flexible body 11. After a drying time of approximately 20 minutes, a second more rigid silicone (higher Shore hardness) is poured to fill the rest of the space between the internal mold 30 and the external mold 40. This rest corresponds to the rigid neck 9. The 20 minutes are sufficient for the first silicone to have had time to solidify. In this way, the first silicone does not mix with the second silicone. After total solidification, the two silicones are secured to each other and together form the part 2.

Once the part 2 has been formed, the fluid allowing dissolving the lower portion 26 is injected through the cylinder 23. This flows into the duct up to the orifice 21, so as to dissolve the lower portion 26.

The dissolved lower portion 26 can then be extracted from the external mold and from the part 2 by flowing through the cylinder 23.

The two portions of the external mold 40 are separated so as to extract the part 2.

The invention claimed is:

1. An apparatus for simulating an atonic uterine body after childbirth, the apparatus comprising a one-piece part, the part comprising:

a flexible body having the shape of an atonic uterine body after childbirth, the flexible body being bendable by hand so that the flexible body reproduces a haptic behavior of an atonic uterine body after childbirth;

a rigid neck extending the flexible body, the rigid neck surrounding an opening of the part, the rigid neck having a rigidity greater than a rigidity of the flexible body;

the part defining an outer surface and an inner surface, the inner surface defining an inner cavity of the part, the inner cavity opening out into the outer surface so as to define the opening.

2. The apparatus according to claim 1, wherein the rigid neck has a Shore A hardness comprised between 25 and 35 and the flexible body has a Shore 00 hardness comprised between 10 and 20.

3. The apparatus according to claim 1, wherein the part comprises silicone and wherein the part and particularly the inner cavity has dimensions equal to dimensions of an atonic uterine body after childbirth.

4. The apparatus according to claim 1, wherein the part is made of composite material, the part comprising:

a first elastic material for the flexible body, a second elastic material for the rigid neck; and a reinforcing layer of a woven textile between the outer surface (3) and the inner surface.

5. The apparatus according to claim 4, wherein the reinforcing layer of a woven textile is located closer to the inner surface than to the outer surface.

6. The apparatus according to claim 4 wherein the woven textile is polyester, the textile having a basis weight greater than or equal to 20 $g/m^2$ and less than or equal to 25 $g/m^2$.

7. The apparatus according to claim 4 wherein the woven textile has a mesh comprised between 200 and 400 meshes per centimeter.

8. The apparatus according to claim 1 wherein the part has a thickness between the inner surface and the outer surface, the thickness being variable along the part, the thickness taking a maximum value in the flexible body.

9. The apparatus according to claim 8 wherein the thickness takes on average in the rigid neck a reference value, a ratio between the maximum value and the reference value being comprised between 1.5 and 2.

10. A gynecological examination simulation system comprising:

an apparatus according to claim 1, and a device comprising a cavity configured to receive the apparatus, the device and the apparatus being configured to be rigidly connected.

11. A method for simulating a therapeutic gesture, the method comprising:

a step of setting up a gynecological examination simulation apparatus according to claim 1, a step of manipulating the inner surface so as to make a fold of the inner surface, and a step of suturing the fold.

12. A method for simulating a therapeutic gesture, comprising:

setting up a gynecological examination simulation apparatus according to claim 1;

inserting an intrauterine balloon into the inner cavity; and inflating the intrauterine balloon.

* * * * *